US007440022B2

United States Patent
Matsumoto (10) Patent No.: US 7,440,022 B2
(45) Date of Patent: Oct. 21, 2008

(54) IMAGE SENSING APPARATUS WITH ELECTRONIC SHUTTER FUNCTION AND MECHANICAL SHUTTER FUNCTION, AND IMAGE SENSING METHOD

(75) Inventor: Toshio Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1814 days.

(21) Appl. No.: 11/109,641

(22) Filed: Dec. 5, 2001

(65) Prior Publication Data

US 2005/0225664 A1  Oct. 13, 2005

(30) Foreign Application Priority Data

Dec. 6, 2000  (JP)  ............................. 2000-371959

(51) Int. Cl.
*G03B 7/083* (2006.01)
*G03B 15/03* (2006.01)
*G03B 7/093* (2006.01)
*H04N 5/238* (2006.01)
*H04N 3/14* (2006.01)
*H04N 5/335* (2006.01)

(52) U.S. Cl. ....................... 348/364; 396/194; 396/247; 348/367; 348/296

(58) Field of Classification Search ............... 348/222.1, 348/296, 362, 363, 364, 367; 396/169, 194, 396/195, 180, 246, 247, 452, 495
See application file for complete search history.

(56) References Cited

U.S. PATENT DOCUMENTS

| 4,827,348 | A | * | 5/1989 | Ernest et al. ............... 348/221.1 |
| 5,153,783 | A | * | 10/1992 | Tamada et al. ............... 386/117 |
| 5,218,452 | A | * | 6/1993 | Kondo et al. ................ 386/120 |
| 5,471,242 | A | * | 11/1995 | Kondo ....................... 348/224.1 |
| 6,157,406 | A | * | 12/2000 | Iura et al. .................. 348/220.1 |
| 6,243,136 | B1 | * | 6/2001 | Sasaki ......................... 348/362 |
| 6,888,570 | B1 | * | 5/2005 | Yoshida ....................... 348/296 |

FOREIGN PATENT DOCUMENTS

| JP | 11-212136 | 8/1999 |
| JP | 11-234574 | 8/1999 |
| JP | 2000-098449 | 4/2000 |
| JP | 2000-295535 | 10/2000 |

* cited by examiner

*Primary Examiner*—Ngoc-Yen T. Vu
*Assistant Examiner*—Albert H Cutler
(74) *Attorney, Agent, or Firm*—Morgan & Finnegan, LLP (57) ABSTRACT

An image sensing apparatus having an electronic shutter for controlling the charge accumulation time of an image sensing element and a mechanical shutter for releasing/shielding an optical path to the image sensing element includes an electronic shutter mode of controlling the image sensing time mainly by the electronic shutter and a mechanical shutter mode of controlling the image sensing time mainly by the mechanical shutter. In the electronic shutter mode, the operations of the electronic and mechanical shutters are controlled to overlap each other, and a charge reading period of the image sensing element and part of a release operation period of the mechanical shutter are controlled to overlap each other.

6 Claims, 8 Drawing Sheets

IMAGE SENSING APPARATUS WITH ELECTRONIC SHUTTER FUNCTION AND MECHANICAL SHUTTER FUNCTION, AND IMAGE SENSING METHOD

FIELD OF THE INVENTION

The present invention relates to an image sensing method and image sensing apparatus and, more particularly, to an image sensing apparatus with an electronic shutter function and mechanical shutter function and an image sensing method.

BACKGROUND OF THE INVENTION

An electronic camera for capturing an image by using an image sensing element such as a CCD (Charge-Coupled Device) for converting light incoming through a photographing lens has an electronic shutter function of controlling the image sensing time by controlling the imaging sensing operation time for receiving light which forms an image. Usually, the electronic camera also has a mechanical shutter for reducing smear or the like caused by redundant light after the image sensing element has received a necessary quantity of light. Further, the electronic camera performs slit exposure using a focal plane shutter, like exposure of a general silver halide film.

As this electronic camera, an electronic camera disclosed in Japanese Patent Laid-Open No. 11-212136 (to be referred to as the first prior art hereinafter) uses a mechanical shutter to control exposure in normal natural light photography, and uses an electronic shutter to control exposure in high-speed photography using an electronic flash device.

As the above-mentioned electronic camera, the following electronic camera is disclosed in Japanese Patent Laid-Open No. 11-234574 (to be referred to as the second prior art hereinafter). When exposure is controlled by mechanical and electronic shutters, the driving start timing of the mechanical shutter or the charge accumulation start timing of the electronic shutter is adjusted to adjust an individual variation error caused by a mechanical delay until actual operation of the mechanical shutter starts in response to an electrical driving start signal for designating a shutter operation in the mechanical shutter since the electrical driving start signal is issued.

In the first prior art, however, the mechanical shutter controls exposure in normal natural light photography, and the highest speed of a shutter speed generally adopted in the electronic camera depends on the performance of the mechanical shutter. Achievement of a high speed of, e.g., $\frac{1}{8,000}$ sec requires a high-performance mechanical shutter. The shutter itself becomes a complicated mechanism, resulting in a large shutter and high cost. The mechanical shutter is technically difficult to drive at a high speed (e.g., $\frac{1}{16,000}$ sec or more).

In the first prior art, the mechanical shutter is generally driven by starting driving of a front blade in response to a front blade driving start signal after the end of a photographing sequence for a preceding frame. The end of driving the front blade is detected by a switch for detecting the end of driving the front blade. Charges are accumulated by a CCD or the like. After charge accumulation ends, driving of a rear blade starts in response to a rear blade driving start signal. The end of driving the rear blade is detected by a switch for detecting the end of driving the rear blade. Then, normal read of signal charges is performed. This arrangement warrants reliable exposure control. However, since the next operation starts upon the end of each operation, the time taken for a photographing sequence per frame is prolonged. Since the next operation starts after the operation status of each switch is monitored, the time taken for a photographing sequence is prolonged. This disables high-speed sequential shooting of an electronic camera.

In the second prior art, variations in exposure control time caused by the mechanical delay between the mechanical shutters of respective electronic cameras are corrected by adjusting the application timing of a mechanical shutter driving pulse or the charge accumulation start timing of the electronic shutter. This adjustment is done for each electronic camera, which increases the time taken to assemble and adjust the electronic camera, and increases the cost. This electronic camera requires a jig for measuring and adjusting variations in exposure time caused by the mechanical delay of the mechanical shutter. If the charge accumulation start timing of the electronic shutter is adjusted, the release time lag of the electronic camera varies between respective electronic cameras. This is inconvenient for a user who uses a plurality of electronic cameras because photographs taken by releasing the shutters of the electronic cameras become different.

SUMMARY OF THE INVENTION

The present invention has been made in consideration of the above situation, and has as its first object to provide an image sensing method and image sensing apparatus capable of preventing degradation of an image caused by smear of an image sensing element.

It is the second object of the present invention to provide an image sensing method and image sensing apparatus capable of preventing the user from feeling incompatibility in switching a photographing sequence.

It is the third object of the present invention to provide an image sensing method and image sensing apparatus capable of achieving a stable frame speed in sequential shooting and an increase in speed without measuring and adjusting variations in exposure time caused by the mechanical delay of a mechanical shutter.

According to the present invention, the foregoing object is attained by providing an image sensing method of sensing an image by an image sensing apparatus having an electronic shutter for controlling a charge accumulation time of an image sensing element and a mechanical shutter for releasing/shielding an optical path to the image sensing element, the method having a first control mode of controlling an image sensing period mainly by the electronic shutter, comprising: a control step of controlling operations of the electronic and mechanical shutters so as to overlap each other, and a charge reading period of the image sensing element and part of a release operation period of the mechanical shutter are controlled to overlap each other.

According to the present invention, the foregoing object is also attained by providing an image sensing apparatus having an electronic shutter for controlling a charge accumulation time of an image sensing element and a mechanical shutter for releasing/shielding an optical path to the image sensing element, and having a first control mode of controlling an image sensing time mainly by the electronic shutter, comprising: a controller adapted to control operations of the electronic and mechanical shutters so as to overlap each other, and controlling a charge reading period of the image sensing element and part of a release operation period of the mechanical shutter to overlap each other.

Further, the foregoing object is also attained by providing an image sensing method of sensing an image by an image sensing apparatus having an electronic shutter for controlling a charge accumulation time of an image sensing element and a mechanical shutter for releasing/shielding an optical path to the image sensing element, the method having a control mode of controlling an image sensing time mainly by the mechanical shutter, comprising: a control step of draining unwanted charges of transfer means prior to transfer of charges of the image sensing element in the control mode.

Furthermore, the foregoing object is also attained by providing an image sensing apparatus having an electronic shutter for controlling a charge accumulation time of an image sensing element and a mechanical shutter for releasing/shielding an incident optical path to the image sensing element, and having a control mode of controlling an image sensing time mainly by the mechanical shutter, comprising: a controller adapted to drain unwanted charges of transfer means for transferring charges of the image sensing element, prior to transfer of charges of the image sensing element in the control mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail in accordance with the accompanying drawings.

Figure 1:
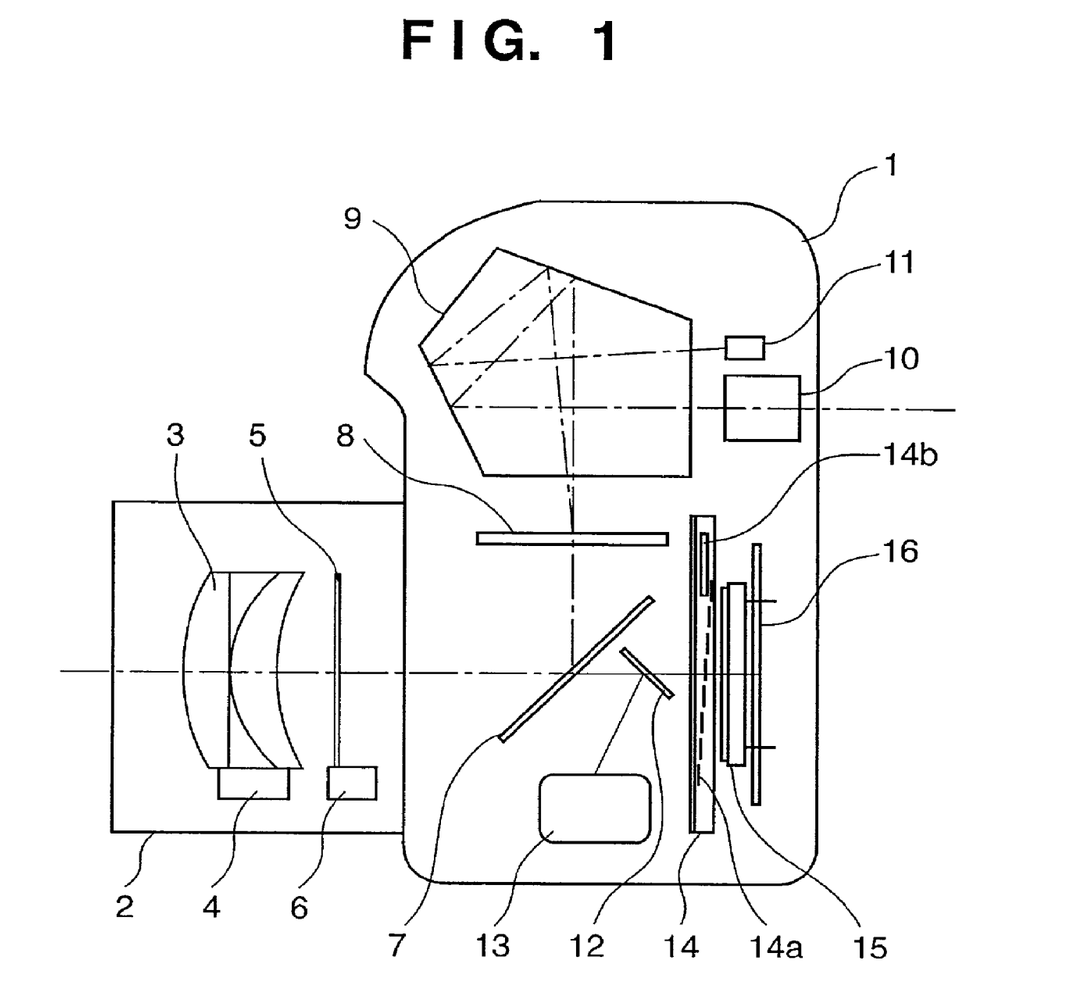
FIG. 1 is a sectional side view showing a structure of an electronic camera as an image sensing apparatus according to an embodiment of the present invention.

FIG. 1 is a sectional side view showing the structure of an electronic camera as an image sensing apparatus according to the embodiment. In FIG. 1, reference numeral 1 denotes an electronic camera main body; and 2, a photographing lens for forming an object image on an imaging plane. The photographing lens 2 is detachably attached to the electronic camera main body 1. The photographing lens 2 has an imaging lens 3 for forming an object image on an imaging plane, and a lens driving device 4 for driving the imaging lens 3. Further, the photographing lens 2 includes aperture blades 5 for controlling exposure, and an aperture driving device 6 for driving the aperture blades 5.

The imaging lens 3 is simplified in FIG. 1, but is formed from one or a plurality of lenses. The imaging lens 3 may be a single-focal-length (fixed-focus) lens or a variable-focal-length lens such as a zoom lens or step zoom lens.

In FIG. 1, reference numeral 7 denotes a main mirror for guiding light from an object (referred to as object image hereinafter) formed by the photographing lens 2 to a focusing screen 8 (to be described later), and transmitting part of the object image to guide it to a focus detection device 13 (to be described later) via a sub-mirror 12 (to be described later). The main mirror 7 is alternatively, freely moved by a mirror driving device (not shown) to a position where the main mirror 7 allows observing an object image via a viewfinder and a retract position where the main mirror 7 is retracted from the optical path of the object image in photographing.

The object image which is guided by the photographing lens 2 and reflected by the main mirror 7 is formed on the focusing screen 8. In viewfinder observation, an object image is formed on the focusing screen 8. Reference numeral 9 denotes an optical member for reflecting an object image formed on the focusing screen 8 into an erect image. The optical member 9 is a pentaprism in this embodiment. Reference numeral 10 denotes an eyepiece lens device for guiding, to the photographer's eye, the object image which has been reflected into an erect image by the optical member 9.

Reference numeral 11 denotes a photometry device for measuring via the optical member 9 the brightness of an object image formed on the focusing screen 8 in viewfinder observation. The electronic camera 1 according to this embodiment controls exposure on the basis of an output signal from the photometry device 11.

The sub-mirror 12 reflects the object image having passed through a part of the main mirror 7, and guides the object image to the focus detection device 13 (to be described later) arranged below a mirror box (not shown). The sub-mirror 12 is coupled with the main mirror 7 or the mirror driving device (not shown) for driving the main mirror 7. The sub-mirror 12 is freely moved to a retract position where the sub-mirror 12 is retracted from the optical path of an object image in photographing and otherwise to a position where the sub-mirror 12 guides an object image having passed through the main mirror 7 to the focus detection device 13.

The lens driving device 4 of the photographing lens 2 is controlled on the basis of an output signal from the focus detection device 13. The focus is adjusted by the imaging lens 3. Reference numeral 14 denotes a mechanical shutter for mechanically controlling a period during which an object image is incident on the imaging plane. The mechanical shutter 14 is a focal plane shutter having front blades 14a which shield an object image in viewfinder observation, and are retracted from the optical path of the object image to start exposure in accordance with a release signal in photographing, and rear blades 14b which are retracted from the optical path of an object image in viewfinder observation, and shield the object image at a predetermined timing after the start of traveling (driving) the front blades 14a in photographing.

Reference numeral 15 denotes a solid-state image sensing element for sensing an object image formed by the photographing lens 2 and converting it into an electrical signal. As the solid-state image sensing element 15, a known two-dimensional image sensing device is used. The image sensing device includes devices of various types such as a CCD type, MOS type, CID type, and any type of image sensing device can be adopted. This embodiment employs an interline CCD (Charge-Coupled Device) type image sensing element which is constituted by two-dimensionally arranging photoelectric conversion elements (photosensors) and outputs signal charges accumulated in each photosensor via vertical and horizontal transfer paths. The solid-state image sensing element 15 has a so-called electronic shutter function of controlling the accumulation time of charges accumulated in each photosensor (shutter speed). Reference numeral 16 denotes an electrical board which is electrically, mechanically coupled to the solid-state image sensing element 15 and holds it.

Figure 2:
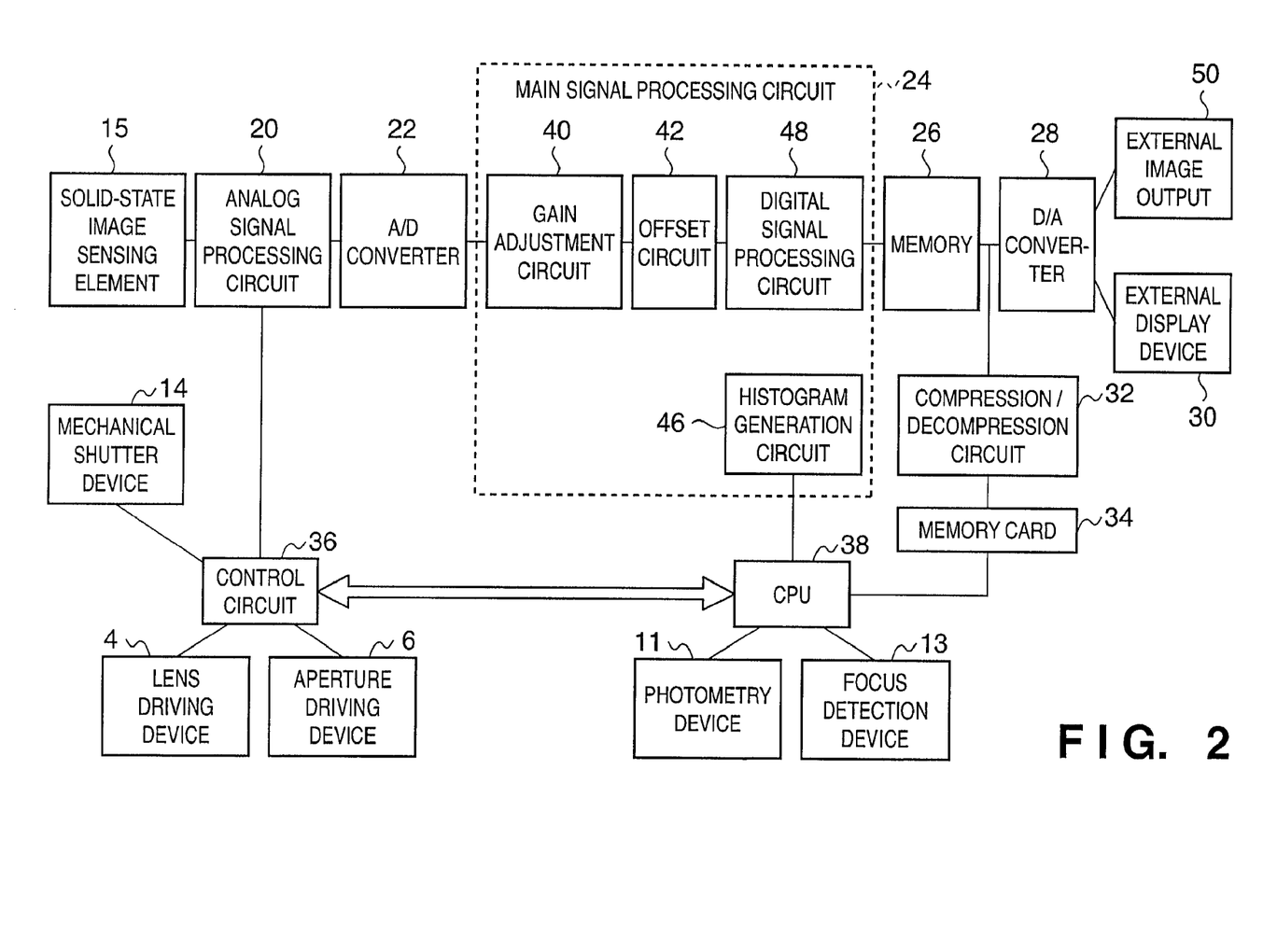
FIG. 2 is a block diagram showing an internal arrangement of the electronic camera as the image sensing apparatus according to the embodiment of the present invention.

FIG. 2 is a block diagram showing the internal arrangement of the electronic camera according to the embodiment.

In FIG. 2, the same reference numerals as in FIG. 1 denote the same parts.

In FIG. 2, the electronic camera is mainly constituted by the lens driving device 4 for driving the photographing lens 2, the mechanical shutter 14, the solid-state image sensing element 15, an analog signal processing circuit 20, an A/D converter 22, a main signal processing circuit 24, a memory 26, a D/A converter 28, an external display device 30, a compression/decompression circuit 32, a memory card 34, a control circuit 36, and a CPU (Central Processing Unit) 38.

An object image having passed through the photographing lens 2 is restricted in light quantity by the aperture blades 5 and mechanical shutter 14, and imaged on the solid-state image sensing element 15. At this time, the charge accumulation time of the solid-state image sensing element 15 is controlled via the control circuit 36. The object image formed on the light-receiving surface of the solid-state image sensing element 15 is converted by photosensors into signal charges of an amount corresponding to the incident light quantity. The signal charges are sequentially read out as image sensing signals, which are supplied to the analog signal processing circuit 20.

The analog signal processing circuit 20 includes a CDS clamp circuit and gain adjustment circuit. The analog signal processing circuit 20 properly processes each image sensing signal (analog electrical signal) input from the solid-state image sensing element 15 under the control of the control circuit 36. The image sensing signal output from the analog signal processing circuit 20 is converted into a digital signal by the A/D converter 22. This digital signal is output to the main signal processing circuit 24.

The main signal processing circuit 24 is made up of a gain adjustment circuit 40, offset circuit 42, histogram generation circuit 46, and digital signal processing circuit 48. Image data output from the A/D converter 22 is output to the histogram generation circuit 46 and digital signal processing circuit 48 via the gain adjustment circuit 40 and offset circuit 42.

From data of one frame sent from the A/D converter 22, the histogram generation circuit 46 creates a histogram representing the distribution of the integral value of an image sensing signal to the signal level. A gain value and offset value are determined based on the histogram calculation. The CPU 38 controls the gain of the gain adjustment circuit and the offset value of the offset circuit via the control circuit 36.

A signal whose gain and offset have been adjusted is sent to the digital signal processing circuit 48. The digital signal processing circuit 48 includes a luminance (Y) signal generation circuit and color difference (C) signal generation circuit. The digital signal processing circuit 48 executes Y/C signal processing for a signal input from the offset circuit 42. The image signal having undergone Y/C signal processing by the digital signal processing circuit 48 is temporarily stored in the memory 26.

The image data stored in the memory 26 is decoded, and then converted into an analog signal by the D/A converter 28. The analog signal is supplied to the external display device 30 such as a liquid crystal monitor. The external display device 30 displays the image captured by the solid-state image sensing element 15. The external display device 30 displays a still image photographed in response to a photographing start signal issued by the press of a shutter button (not shown).

The signal converted into an analog signal by the D/A converter 28 can be extracted as an external image output 50 from a video output terminal or the like.

Image data obtained by photographing in response to input of a photographing start signal is supplied from the memory 26 to the compression/decompression circuit 32 where the data is compressed in a predetermined format (e.g., JPEG). The compressed data is recorded on a recording medium such as the memory card 34.

The recording medium can take various forms such as a smart medium and IC card.

The image data recorded on the memory card 34 can be read under the control of the CPU 38. The read image data is decompressed by the compression/decompression circuit 32. The decompressed data is output to the external display device 30 via the memory 26 and D/A converter 28, or supplied to a video signal output terminal (not shown) or the like so as to be output to another external device.

The CPU 38 is connected to the photometry device 11, focus detection device 13, control circuit 36, histogram generation circuit 46, digital signal processing circuit 48, memory 26, memory card 34, and so on. The CPU 38 conducts various calculation operations for, e.g., the exposure value and the focal position of the photographing lens 2 in accordance with a predetermined algorithm. The CPU 38 systematically executes auto exposure control, auto focus control, auto flash control, auto white balance control, and the like. The CPU 38 controls circuits on the basis of various signals input from operation units (not shown) such as a release button and mode setting means.

An output signal from the photometry device 11 is sent to the CPU 38, which calculates an exposure control value representing an exposure time. The obtained exposure control value is output from the CPU 38 to the control circuit 36. Auto exposure control, auto flash control, auto white balance control, and the like are executed via the control circuit 36.

Exposure control of the electronic camera according to this embodiment is performed in two exposure control modes: an electronic shutter control mode and mechanical shutter control mode. The electronic and mechanical shutter control modes are automatically switched by the control circuit 36 and CPU 38.

More specifically, the control circuit 36 controls the driving circuit of the solid-state image sensing element 15 on the basis of an exposure control value sent from the CPU 38. In the electronic shutter control mode, the charge accumulation time of the solid-state image sensing element 15 is controlled. In the mechanical shutter control mode, the opening/closing timing of the mechanical shutter 14 is controlled, and during exposure, the aperture driving device 6 is controlled.

Figure 3:
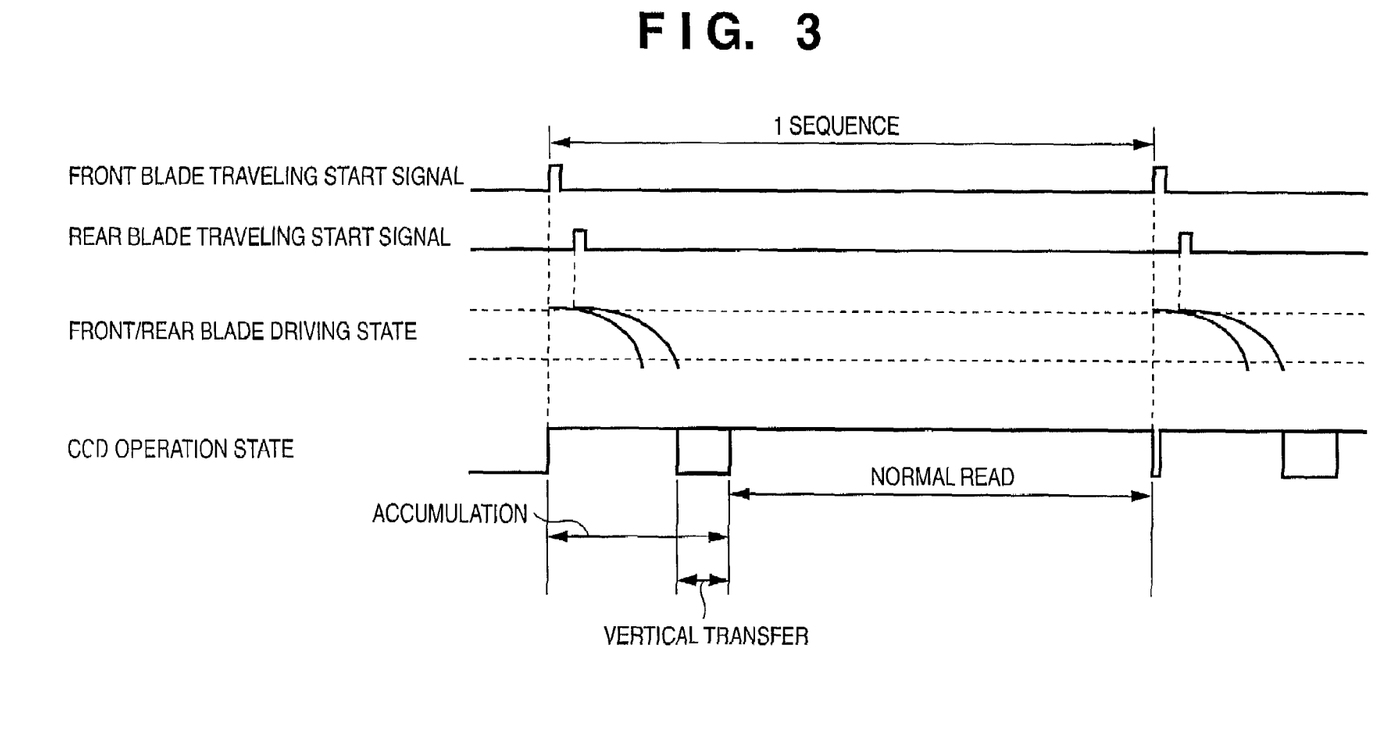
FIG. 3 is a timing chart showing a sequence in the mechanical shutter control mode of the electronic camera as the image sensing apparatus according to the embodiment of the present invention.
Figure 4:
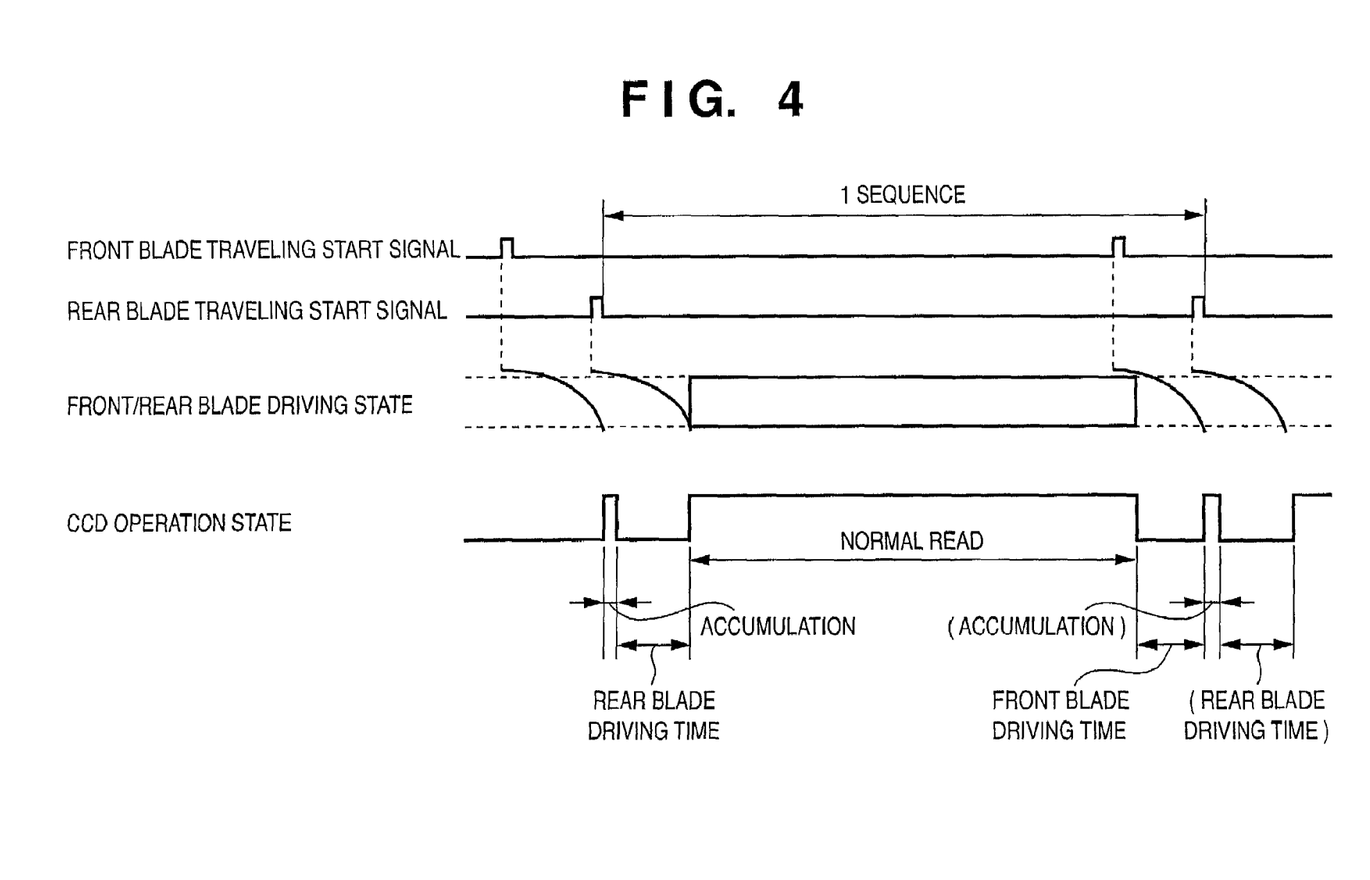
FIG. 4 is a timing chart showing a sequence in the electronic shutter control mode of the electronic camera as the image sensing apparatus according to the embodiment of the present invention.
Figure 5:
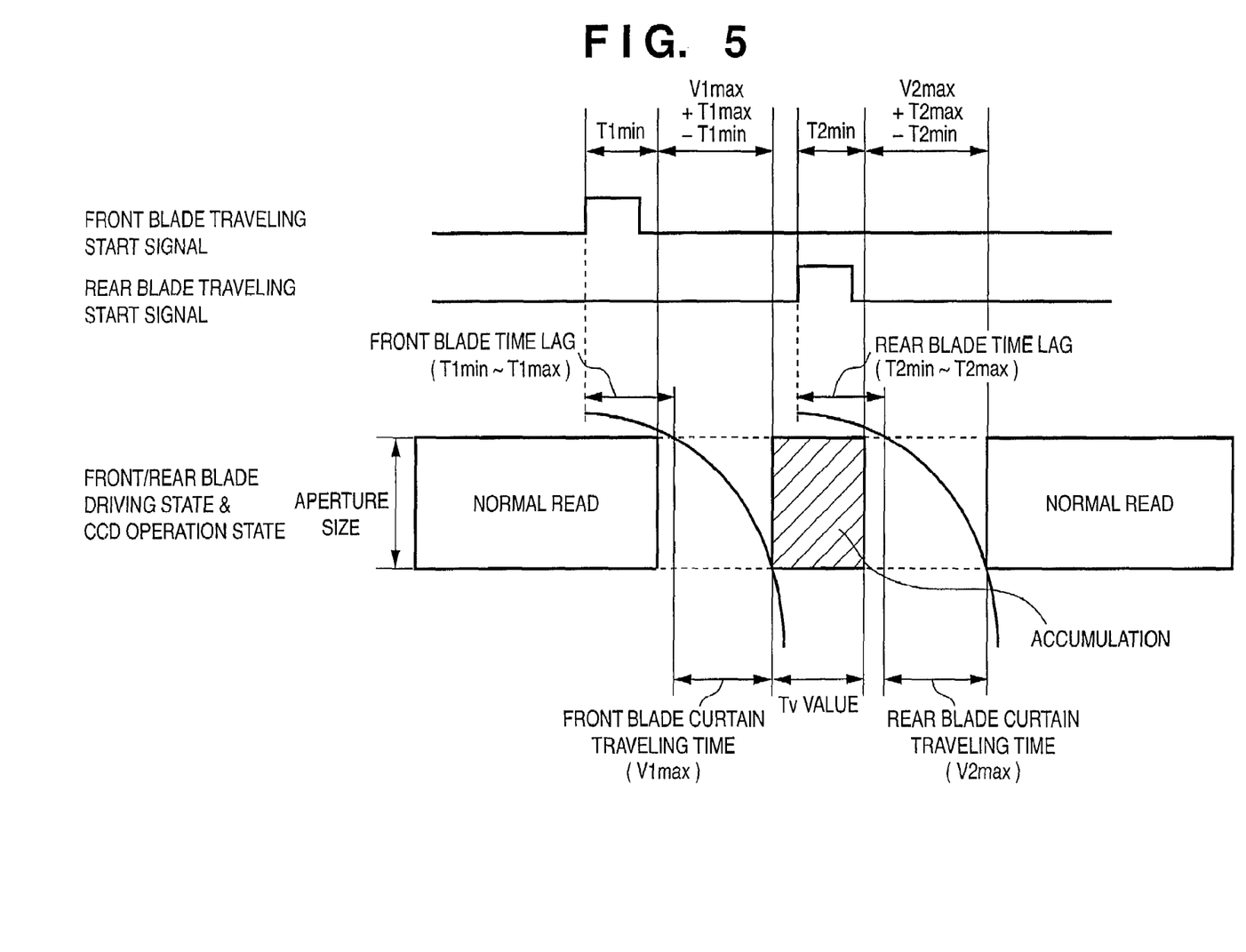
FIG. 5 is a timing chart showing the control sequence of a mechanical shutter in the electronic shutter control mode of FIG. 4.

FIGS. 3 to 5 are timing charts for explaining the photographing sequences of the electronic camera in the electronic and mechanical shutter control modes. FIG. 3 shows a photographing sequence in the mechanical shutter control mode, FIG. 4 shows a photographing sequence in the electronic shutter control mode, and FIG. 5 shows the control sequence of the mechanical shutter 14 in the electronic shutter control mode of FIG. 4.

The photographing sequence in the mechanical shutter control mode will be explained with reference to FIG. 3. In FIG. 3, if the CPU 38 determines to perform exposure control in the mechanical shutter control mode, the control circuit 36 starts driving the front blades 14a (i.e., opens the closed front blades 14a) by outputting a front blade traveling start signal to the mechanical shutter 14 on the basis of an exposure control value from the CPU 38. At the same time, the control circuit 36 starts a charge accumulation operation by operating the solid-state image sensing element 15. The control circuit 36 starts driving the rear blades 14b (i.e., closes the opened rear blades 14b) by outputting a rear blade traveling start signal to the mechanical shutter 14 on the basis of a Tv value (target image sensing time) set in accordance with the exposure control value from the CPU 38. In this manner, the front and rear blades 14a and 14b are respectively opened and closed to control exposure of the solid-state image sensing element 15.

After driving of the rear blades 14b of the mechanical shutter 14 ends, the solid-state image sensing element 15 continues the charge accumulation operation. To eliminate the influence of smear caused by an excessive quantity of incident light in exposure, the solid-state image sensing element 15 reads out and drains a smear component leaking to a vertical transfer CCD before shifting signal charges accumulated in photoelectric conversion elements to the vertical transfer CCD. Then, the solid-state image sensing element 15 ends the charge accumulation operation, and transfers signal charges accumulated in the photoelectric conversion elements to the vertical transfer CCD. The solid-state image sensing element 15 performs normal read which is a signal charge read operation, and ends the photographing sequence of one frame.

The photographing sequence in the electronic shutter control mode will be explained with reference to FIG. 4. In FIG. 4, if the CPU 38 determines to perform exposure control in the electronic shutter control mode, the control circuit 36 starts driving the front blades 14a (i.e., opens the front blades 14a) by outputting a front blade traveling start signal to the mechanical shutter 14 on the basis of an exposure control value from the CPU 38. After the front blades 14a are completely opened, the control circuit 36 starts a charge accumulation operation by operating the solid-state image sensing element 15, and controls the charge accumulation time by a Tv value set based on the exposure control value from the CPU 38.

The control circuit 36 starts driving the rear blades 14b (i.e., closes the rear blades 14b) by outputting a rear blade traveling start signal to the mechanical shutter 14 in consideration of the charge accumulation end timing to shield light from the solid-state image sensing element 15. The solid-state image sensing element 15 transfers signal charges accumulated in the photoelectric conversion elements at the end of the charge accumulation time. At the driving end timing of the rear blades 14b, the solid-state image sensing element 15 performs a normal reading operation which is a signal charge read operation, and ends the photographing sequence of one frame.

The control sequence of the mechanical shutter 14 in the electronic shutter control mode will be described with reference to FIG. 5. In FIG. 5, a front blade time lag T1 is a time until the main body aperture unit (to be referred to as an aperture hereinafter) is actually opened after the front blades 14a of the mechanical shutter 14 are driven by a front blade traveling start signal from the control circuit 36 at the start of an exposure operation. A front blade curtain traveling time V1 is a time taken to travel the aperture by the front blades 14a. A rear blade time lag T2 is a time until the aperture is actually shielded from light after the rear blades 14b of the mechanical shutter 14 are driven by a rear blade traveling start signal from the control circuit 36 at the end of the exposure operation. A rear blade curtain traveling time V2 is a time taken to travel the aperture by the rear blades 14b. The front blade time lag T1, front blade curtain traveling time V1, rear blade time lag T2, and rear blade curtain traveling time V2 vary between individual cameras with a time width within a certain range owing to a mechanical factor. As for variations in time lag and traveling time, subscripts "min" and "max" are attached to the shortest and longest ones, respectively.

The mechanical shutter 14 is driven such that driving of the front blades 14a starts by a front blade traveling start signal after the end of the photographing sequence of a preceding frame (end of a normal reading operation), the end of driving of the front blades 14a is detected by, e.g., a switch for detecting the end of driving of the front blades 14a, and then a normal reading operation of signal charges is done. This achieves reliable exposure control.

However, starting the next operation after the end of each operation prolongs a time taken for a photographing sequence per frame. Starting the next operation after monitoring the operation status of each switch also prolongs the time taken for the sequence, failing in high-speed sequential shooting of the electronic camera.

To prevent this, the electronic camera according to the embodiment manages all operation start timings by the time in the electronic shutter control mode, and overlap-controls operations.

In FIG. 5, the control circuit 36 outputs a front blade traveling start signal a time T1min before the end of a normal reading operation of a preceding frame. In this way, the control circuit 36 makes the normal reading operation of the preceding frame overlap driving of the front blades 14a of the mechanical shutter 14 for the next frame by the time T1min. Charge accumulation of the next frame starts T1max+V1max after the output of the front blade traveling start signal.

The time between the end of the normal reading operation of the preceding frame and the start of charge accumulation of the next frame is V1max+(T1max−T1min), which is determined by the longest time of the front blade curtain traveling time V1 and the variation of the front blade time lag T1−.

The control circuit 36 outputs a rear blade traveling start signal a time T2min before the end of signal accumulation of the photographing frame. In this way, the control circuit 36 makes charge accumulation of the photographing frame overlap driving of the rear blades 14b of the mechanical shutter 14 by the time T2min. The normal reading operation of the photographing frame starts T2max+V2max after the output of the rear blade traveling start signal.

The time between the end of charge accumulation of the photographing frame and the start of a normal reading operation is V2max+(T2max−T2min), which is determined by the longest time of the rear blade curtain traveling time V2 and the variation of the rear blade time lag T2.

In exposure control using the electronic shutter control mode, the electronic camera according to the embodiment can perform overlap control of driving of the front blades 14a of the mechanical shutter 14 for a photographing frame and a normal reading operation of the preceding frame, thereby shortening the time between the end of the normal reading operation of the preceding frame and a charge accumulation operation of the photographing frame. Further, the electronic camera can perform overlap control of a charge accumulation operation of the photographing frame and driving of the rear blades 14b of the mechanical shutter 14, thereby shortening the time between the end of charge accumulation of the photographing time and the start of a normal reading operation.

Not only a high-performance mechanical shutter device (having high curtain speed) coping with high shutter speed, but also a mechanical shutter device which exhibits a short variation in the front/rear blade time lag can shorten the time between the end of a normal reading operation of a preceding frame and the start of charge accumulation time of the next frame and the time between the end of charge accumulation of the photographing frame and the start of a normal reading operation. Accordingly, a time required for one photographing sequence can be shortened, realizing high-speed sequential shooting.

In the electronic camera according to the embodiment, the operation sequences of the mechanical shutter 14 and solid-state image sensing element 15 are different between the electronic and mechanical shutter control modes, as shown in FIGS. 3 and 4. Thus, a time required for one sequence differs. In particular, the mechanical shutter control mode of FIG. 3 executes vertical transfer before a normal reading operation. This prolongs the time required for one sequence in comparison with the electronic shutter control mode of FIG. 4, which is disadvantageous to high-speed sequential shooting.

To avoid this, the CPU 38 of the electronic camera according to the embodiment switches the control sequence depending on the shutter speed in exposure control in consideration of the merits of respective control sequences.

In the electronic shutter control mode, the time required for one sequence is short, and only the charge accumulation time of the solid-state image sensing element 15 is controlled for exposure. Therefore, this mode is executed when high-shutter-speed control is required since very-high-shutter-speed control is possible in this mode. Low-shutter-speed control is performed in the mechanical shutter control mode, since it is possible to eliminate the influence of smear caused by an excessive amount of incident light due to a long exposure by reading out and drain a smear component leaking to the vertical transfer CCD. Thus, a signal of high S/N (Signal-to-Noise) free from the influence of smear can be read out.

Figure 6:
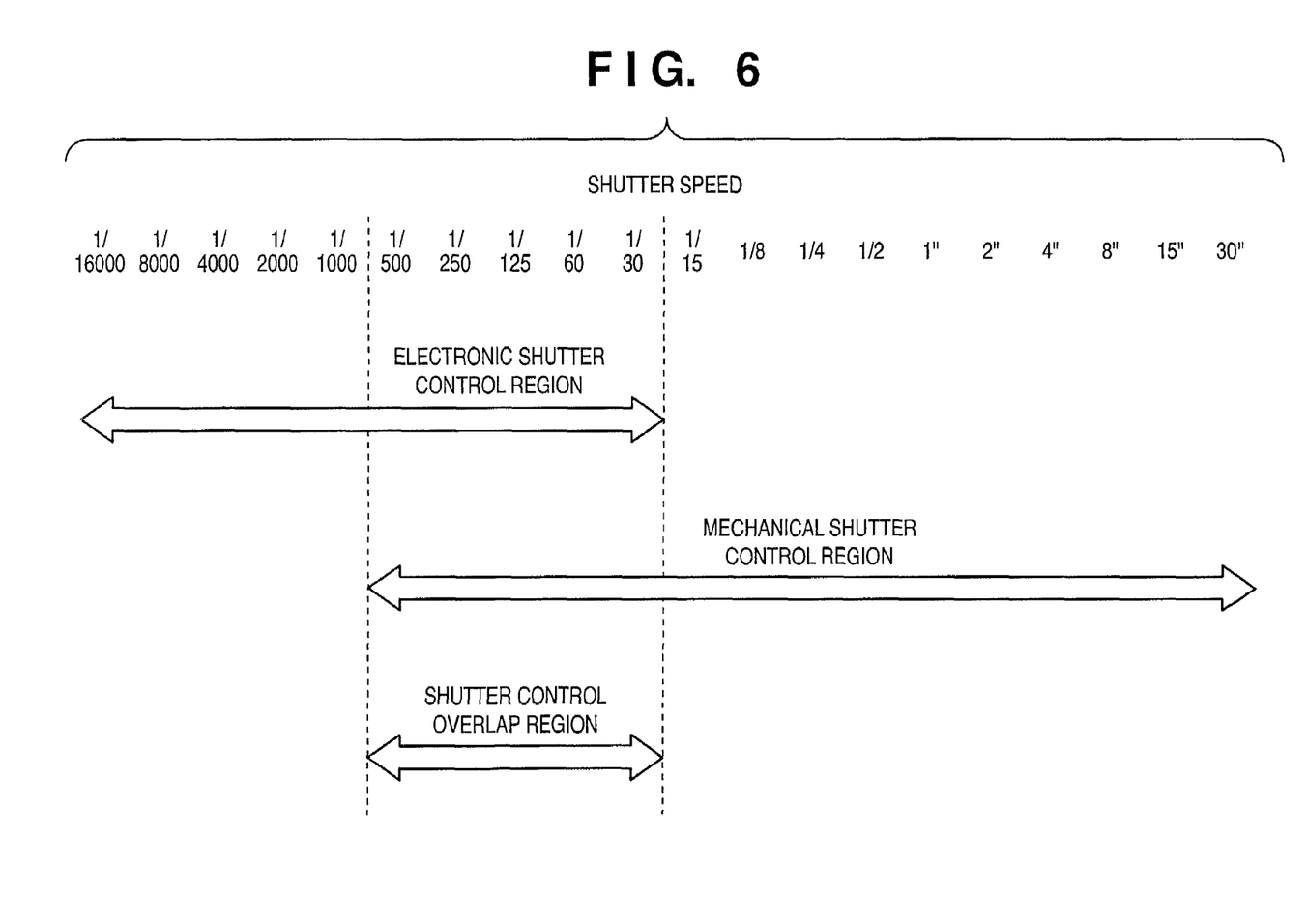
FIG. 6 is a view showing the shutter speed control regions of the electronic and mechanical shutter control modes in the electronic camera as the image sensing apparatus according to the embodiment of the present invention.

FIG. 6 is a view showing the shutter speed control regions of the electronic and mechanical shutter control modes in the electronic camera according to the embodiment. In FIG. 6, the electronic shutter control mode is set to perform shutter speed control at a speed higher than $1/30$ sec. The mechanical shutter control mode is set to perform shutter speed control at a speed lower than $1/500$ sec. At a shutter speed of $1/500$ sec to $1/30$ sec, a control mode can be selected from the electronic and mechanical shutter control modes.

The electronic camera according to the embodiment switches the control sequence between the electronic and mechanical shutter control modes in correspondence with a shutter speed set by the CPU 38.

The operation of the electronic camera according to the embodiment with the above-described arrangement will be described with reference to the flow charts of FIGS. 7 and 8.

Figure 7:
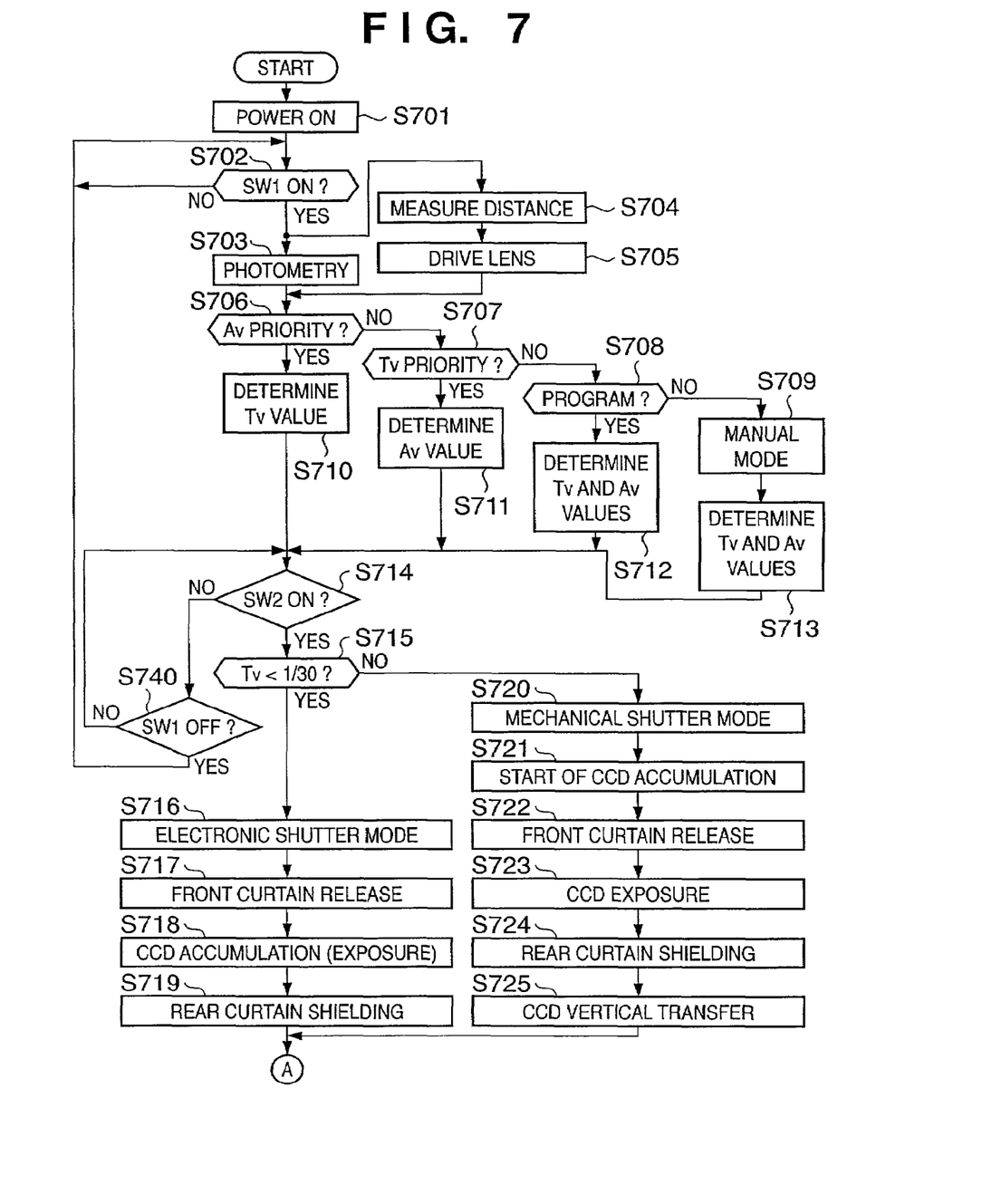
FIG. 7 is a flow chart showing the operation flow of the electronic camera as the image sensing apparatus according to the embodiment of the present invention.

In FIG. 7, if a power switch (not shown) is turned on in step S701, the electronic camera changes to a photographing standby state. If a switch SW1 (not shown) is turned on by, e.g., a half stroke of a release button (not shown) in step S702, the photometry device 11 executes photometry in step S703, and the focus detection device 13 performs distance measurement in step S704. In step S705, the photographing lens 2 is driven based on the distance measurement result of the focus detection device 13.

Based on a photographing exposure mode selected by a photographing mode selection switch (not shown), an f-number (Av value) and image sensing time (Tv value) corresponding to the photographing exposure mode are determined (steps S706 to S713).

In step S706, whether the photographing exposure mode is an aperture (Av) priority mode is checked. If YES in step S706, the Av value is set to an arbitrary value chosen by the user. In step S710, a Tv value is determined in accordance with the photometry value measured in step S703. Then, the flow advances to step S714.

If NO in step S706, whether the photographing exposure mode is a photographing time (Tv) priority mode is checked in step S707. If YES in step S707, the Tv value is set to an arbitrary value chosen by the user. In step S711, an Av value is determined in accordance with the photometry value measured in step S703. After that, the flow advances to step S714.

If NO in step S707, whether the photographing exposure mode is a program mode is checked in step S708. If YES in step S708, Av and Tv values are determined in step S712 from a preset program chart (not shown) in accordance with the photometry value measured in step S703. Then, the flow shifts to step S714.

The program chart includes various patterns. Regardless of one or a plurality of patterns, the program chart basically passes through the same flow.

If NO in step S708, the flow shifts to step S709 to determine the photographing exposure mode as a manual mode. Tv and Av values are set to arbitrary values chosen by the user on the basis of the photometry value measured in step S703. The flow advances to step S714.

In this fashion, the Tv value (target image sensing time) and the Av value (target f-number) are determined till step S714 regardless of a selected mode.

In step S714, whether a switch SW2 (not shown) is turned on by, e.g., a full stroke of the release switch (not shown) is checked. If NO in step S714, whether the switch SW1 is turned off is checked in step S740. If NO in step S740, the flow returns to step S714; or if YES, to step S702.

If YES in step S714, the CPU 38 checks in step S715 whether the Tv value determined in steps S707, S710, S712, and S713 is higher than $1/30$ sec (Tv<$1/30$). If YES in step S715, the flow shifts to step S716 to set the exposure control mode of the electronic camera to the electronic shutter control mode, as described above (see FIG. 6).

After the exposure control mode is set to the electronic shutter control mode in step S716, the flow advances to step S717. The control circuit 36 outputs a front blade traveling start signal to the mechanical shutter 14 on the basis of an exposure control value from the CPU 38, thereby starting driving the front blades 14a (front curtain release). Note, when a sequential photographing is performed, the front blades 14a start driving a period V1min before reading of charges accumulated in the previous frame completes (see FIG. 5). The flow shifts to step S718.

A period of T1max+V1max (see FIG. 5) has passed after the front blades 14a starts driving, the control circuit 36 operates the solid-state image sensing element 15 to start a charge accumulation operation in step S718. The control circuit 36 controls the charge accumulation time by the determined Tv value on the basis of the exposure control value from the CPU 38. The flow shifts to step S719.

T2min (see FIG. 5) before the end timing of charge accumulation, the control circuit 36 outputs a rear blade traveling start signal to the mechanical shutter 14 in step S719. The control circuit 36 starts driving the rear blades 14b, and changes the solid-state image sensing element 15 to a light-shielding state (rear curtain shielding). The flow advances to step S726 of FIG. 8.

If NO in step S715, the flow advances to step S720 to set the exposure control mode of the electronic camera to the mechanical shutter control mode so as to control exposure by the mechanical shutter 14, as described above (see FIG. 5).

In step S720, the exposure control mode is set to the mechanical shutter control mode. As described above (see FIG. 3), the control circuit 36 operates the solid-state image sensing element 15 in step S721 on the basis of an exposure control value from the CPU 38, thereby starting a charge accumulation operation. In step S722, the control circuit 36 outputs a front blade traveling start signal to the mechanical shutter 14, thereby starting driving the front blades 14a (front curtain release). Then, the control circuit 36 performs exposure to the solid-state image sensing element 15 in step S723.

In step S724, the control circuit 36 outputs a rear blade traveling start signal to the mechanical shutter 14 by the determined Tv value on the basis of the exposure control value from the CPU 38. The control circuit 36 starts driving the rear blades 14b to shield an object image, and ends the exposure operation to the solid-state image sensing element 15 by the front and rear blades 14a and 14b (rear curtain shielding).

After traveling of the rear blades of the mechanical shutter 14 ends, the solid-state image sensing element 15 continues the charge accumulation operation. To eliminate the influence of smear caused by an excessive quantity of incident light in exposure, the solid-state image sensing element 15 reads out (vertically transfers) and drains a smear component leaking to the vertical transfer CCD before shifting signal charges accumulated in the photoelectric conversion elements of the solid-state image sensing element 15 to the vertical transfer CCD. Thereafter, the flow advances to step S726 of FIG. 8.

Figure 8:
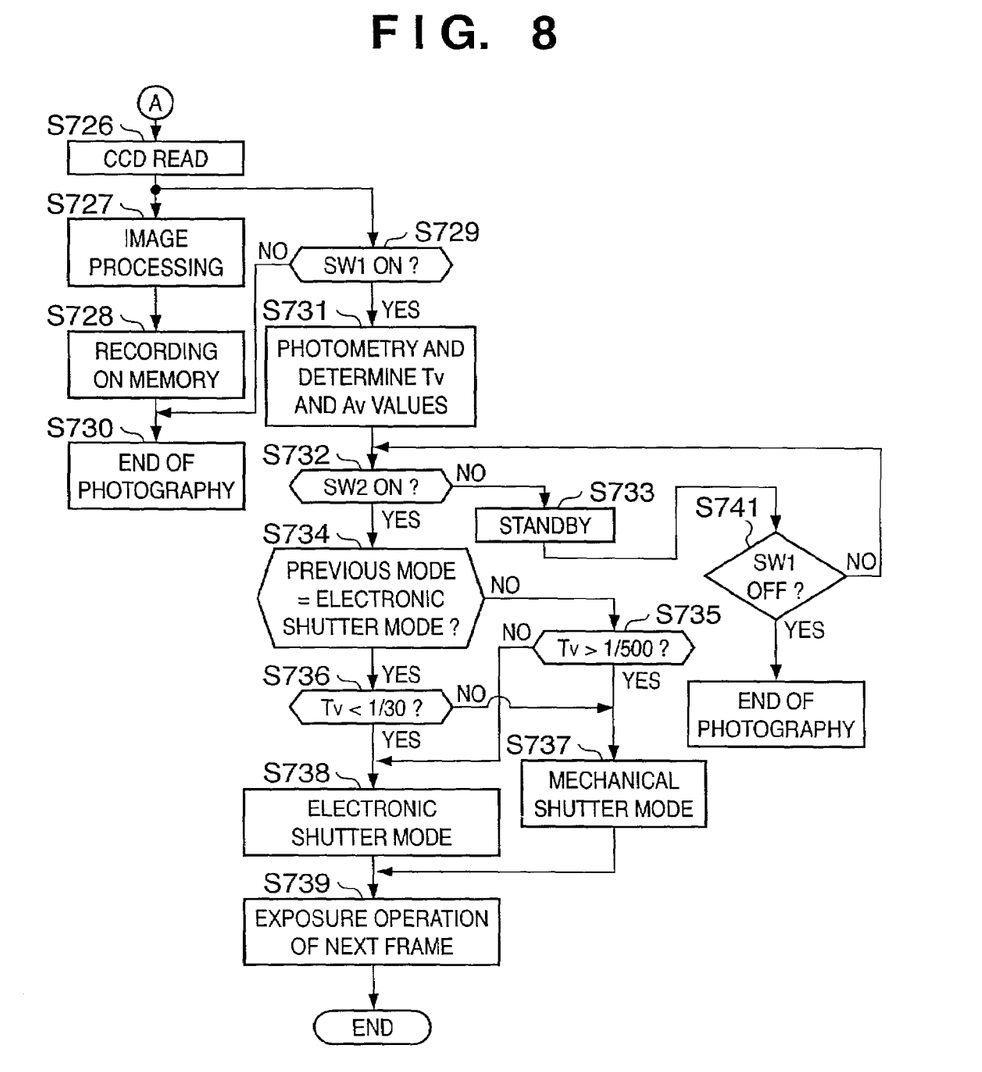
FIG. 8 is a flow chart showing the operation flow of the electronic camera as the image sensing apparatus according to the embodiment of the present invention.

In FIG. 8, the solid-state image sensing element 15 ends the charge accumulation operation in step S726, and transfers signal charges accumulated in the photoelectric conversion elements to the vertical transfer CCD. Note, when the electric shutter control mode has been selected, this transfer operation starts a period T2max+V2max after the rear blades 14b start driving (see FIG. 5). Further, the solid-state image sensing element 15 executes a normal reading operation which is a signal charge reading operation. Image processing is done in step S727, an image is recorded on the memory card 34 in step S728, and this processing operation ends in step S730.

At the same time as image processing in step S727, whether the switch SW1 (not shown) is turned on by a half stroke of the release button (not shown) is checked in step S729. If NO in step S729, the processing operation ends in step S730; whereas if YES, the CPU 38 determines that the photographing mode is a sequential shooting mode. The flow shifts to step S731 for preparations for the photography of the next frame. Photometry by the photometry device 11, and determination of Tv and Av values by the same operation as that in steps S706 to S713 are performed.

Whether the switch SW2 (not shown) is turned on by a full stroke of the release button (not shown) is checked in step S732. If NO in step S732, sequential shooting is determined to have been suspended. The electronic camera shifts to the standby state in step S733, and whether the switch SW1 is turned off is checked in step S741. If NO in step S741, the electronic camera waits in the standby state, and the flow returns to step S732, and if YES in step S741, the sequential shooting is terminated. If YES in step S732, the flow advances to step S734 in order to perform a photographing operation of the next frame.

In step S734, the shutter control mode of the preceding frame is checked, i.e., whether the previous mode is the electronic shutter control mode is checked. If YES in step S734, the CPU 38 determines in step S736 whether the current Tv value is higher than 1/30 sec (Tv<1/30). If YES in step S736, the CPU 38 sets the electronic shutter control mode in step S738, and performs an exposure operation of the next frame in step S739 by the same operation as that in steps S717 to S719. If the current Tv value is determined to be equal to or lower than 1/30 sec (Tv>1/30) in step S736 (NO), the CPU 38 sets the mechanical shutter control mode in step S737, and performs an exposure operation of the next frame in step S739 by the same operation as that in steps S721 to S725.

If photography of the previous frame is determined in step S734 to be not the electronic shutter control mode but the mechanical shutter control mode, the flow advances to step S735, and the CPU 38 checks whether the current Tv value is lower than 1/500 sec (Tv>1/500). If YES in step S735, the flow advances to step S737. The CPU 38 sets the mechanical shutter control mode, and performs an exposure operation of the next frame in step S739 by the same operation as that in steps S721 to S725.

If the current Tv value is determined in step S735 to be higher than 1/500 sec (Tv<1/500), the flow shifts to step S738. The CPU 38 sets the electronic shutter control mode, and performs an exposure operation of the next frame in step S739 by the same operation as that in steps S717 to S719.

In the electronic camera according to the embodiment, the overlap region between the control ranges of the electronic and mechanical shutter control modes is set as a hysteresis region. Even if the exposure control value changes, the exposure control sequence preferentially continues in photography of a preceding frame. This prevents frequent switching of the exposure control sequence at the boundary of a given shutter speed every time exposure of an object to be photographed changes during sequential shooting.

As described above, this embodiment greatly increases the exposure speed (shutter speed) without using a high-performance mechanical shutter, and sets the low-speed range to the mechanical shutter control mode. Degradation of an image caused by smear of an image sensing element can be prevented at low cost.

An overlap region is set in switching between the electronic and mechanical shutter control sequences. This can prevent switching of the sequence upon taking every picture, and can realize smooth switching of the sequence.

A hysteresis region is set in switching between the electronic and mechanical shutter control sequences. This can prevent switching of the sequence at a given shutter speed upon taking every picture, can realize smooth switching of the sequence, and can prevent the user from feeling incompatibility in switching the sequence.

When exposure is controlled by both the mechanical and electronic shutters, the mechanical shutter is driven by a time which considers individual variations in advance with respect to individual variations in exposure control time caused by the mechanical delay of the mechanical shutter. Variations in exposure time caused by the mechanical delay of the mechanical shutter need not be measured/adjusted, smoothly simplifying the assembly and reducing the cost.

Since the driving start timing of the mechanical shutter overlaps driving of the image sensing element (traveling of the front/rear blades of the mechanical shutter starts during driving of the image sensing element), a stable frame speed in sequential shooting and an increase in speed can be achieved.

OTHER EMBODIMENT

The present invention can be applied to a system constituted by a plurality of devices (e.g., host computer, interface, camera head) or to an apparatus comprising a single device (e.g., digital camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the timing charts shown in FIGS. 3 to 5 and the flowcharts shown in FIGS. 7 and 8 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image sensing method of sensing an image by an image sensing apparatus having an electronic shutter for controlling a charge accumulation time of an image sensing element and a mechanical shutter for releasing/shielding an optical path to the image sensing element, the method having a first control mode of controlling an image sensing method period mainly by the electronic shutter, comprising:

a control step of controlling operations of the electronic and mechanical shutters so as to overlap each other, and a charge reading period of the image sensing element and part of a release operation period of the mechanical shutter are controlled to overlap each other, wherein the mechanical shutter has front blades for releasing the optical path to the image sensing element and rear blades for shielding the optical path to the image sensing element, and letting T1min be a shortest time until release of a predetermined region starts after the front blades start the release operation, the release operation of the front blades starts T1min before completion of read of charges accumulated in the image sensing element in previous photography in said control step in the first control mode.

2. The method according to claim 1, wherein letting T1max be a longest time until release of the predetermined region starts after the front blades start the release operation, and V1max be a longest time until release of the predetermined region is completed after the front blades start releasing the predetermined region, accumulation in the image sensing element starts V1max+T1max after the front blades start the release operation in said control step in the first control mode.

3. An image sensing method of sensing an image by an image sensing apparatus having an electronic shutter for controlling a charge accumulation time of an image sensing element and a mechanical shutter for releasing/shielding an optical path to the image sensing element, the method having a first control mode of controlling an image sensing method period mainly by the electronic shutter, comprising:

a control step of controlling operations of the electronic and mechanical shutters so as to overlap each other, and a charge reading period of the image sensing element and part of a release operation period of the mechanical shutter are controlled to overlap each other, wherein in said control step, the charge accumulation period of the image sensing element and part of a shielding operation of the mechanical shutter after release of the mechanical shutter are controlled to overlap each other, wherein the mechanical shutter has front blades for releasing the optical path to the image sensing element and rear blades for shielding the optical path to the image sensing element, and letting T2min be a shortest time until shielding of a predetermined region starts after the rear blades start a shielding operation, the shielding operation of the rear blades starts T2min before end time of charge accumulation in the image sensing element in said control step in the first control mode, and wherein letting T2max be a longest time until shielding of the predetermined region starts after the rear blades start the shielding operation, and V2max be a longest time until shielding of the predetermined region is completed after the rear blades start shielding the predetermined region, reading of charges accumulated in the image sensing element starts V2max+T2max after the rear blades start the shielding operation in said control step in the first control mode.

4. An image sensing apparatus having an electronic shutter for controlling a charge accumulation time of an image sensing element and a mechanical shutter for releasing/shielding an optical path to the image sensing element, and having a first control mode of controlling an image sensing time mainly by the electronic shutter, comprising:

a controller adapted to control operations of the electronic and mechanical shutters so as to overlap each other, and controlling a charge reading period of the image sensing element and part of a release operation period of the mechanical shutter to overlap each other, wherein the mechanical shutter has front blades for releasing the optical path to the image sensing element and rear blades for shielding the optical path to the image sensing element, and letting T1min be a shortest time until release of a predetermined region starts after the front blades start the release operation, said controller controls to start the release operation of the front blades T1min before completion of read of charges accumulated in the image sensing element in previous photography in the first control.

5. The apparatus according to claim 4, wherein letting T1max be a longest time until release of the predetermined region starts after the front blades start the release operation, and V1max be a longest time until release of the predetermined region is completed after the front blades start releasing the predetermined region, said controller starts accumulation in the image sensing element V1max+T1max after the front blades start the release operation in the first control mode.

6. An image sensing apparatus having an electronic shutter for controlling a charge accumulation time of an image sensing element and a mechanical shutter for releasing/shielding an optical path to the image sensing element, and having a first control mode of controlling an image sensing time mainly by the electronic shutter, comprising:

a controller adapted to control operations of the electronic and mechanical shutters so as to overlap each other, and controlling a charge reading period of the image sensing element and part of a release operation period of the mechanical shutter to overlap each other, wherein said controller controls the charge accumulation period of the image sensing element and part of a shielding operation of the mechanical shutter after release of the mechanical shutter so as to overlap each other, wherein the mechanical shutter has front blades for releasing the optical path to the image sensing element and rear blades for shielding the optical path to the image sensing element, and letting T2min be a shortest time until shielding of a predetermined region starts after the rear blades start a shielding operation, said controller controls to start the shielding operation of the rear blades T2min before end time of charge accumulation in the image sensing element in the first control mode, and wherein letting T2max be a longest time until shielding of the predetermined region starts after the rear blades start the shielding operation, and V2max be a longest time until shielding of the predetermined region is completed after the rear blades start shielding the predetermined region, said controller starts reading of charges accumulated in the image sensing element V2max+T2max after rear blades start the shielding operation in the image sensing element in the first control mode.

* * * * *